United States Patent [19]

Ziemek et al.

[11] Patent Number: 4,674,543

[45] Date of Patent: Jun. 23, 1987

[54] TUBE HAVING AN ARMORING CONSISTING OF A PLURALITY OF WIRES

[75] Inventors: Gerhard Ziemek; Friedrich Schatz, both of Langenhagen, Fed. Rep. of Germany

[73] Assignee: Kabelmetal Electro Gesellschaft mit Beschränkter Haftung, Hanover, Fed. Rep. of Germany

[21] Appl. No.: 675,575

[22] Filed: Nov. 28, 1984

[30] Foreign Application Priority Data

Dec. 9, 1983 [DE] Fed. Rep. of Germany ....... 3344544
Dec. 21, 1983 [DE] Fed. Rep. of Germany ....... 3346169

[51] Int. Cl.[4] ............................ F16L 9/04; F16L 9/18

[52] U.S. Cl. .................................. 138/153; 138/122; 138/132; 138/173; 138/140

[58] Field of Search ............... 138/129, 132, 133, 144, 138/134, 153, 172, 174, 173, DIG. 5, 122, 121, 140; 74/501 P

[56] References Cited

U.S. PATENT DOCUMENTS

| | | | |
|---|---|---|---|
| 3,477,474 | 11/1969 | Mesler | 138/174 |
| 3,831,636 | 8/1974 | Bittner | 138/173 |
| 4,099,425 | 7/1978 | Moore | 138/133 X |
| 4,162,370 | 7/1979 | Dunn et al. | 138/122 X |
| 4,224,463 | 9/1980 | Koerber et al. | 138/122 X |

*Primary Examiner*—James E. Bryant, III
*Attorney, Agent, or Firm*—Martin A. Farber

[57] ABSTRACT

In the case of strand-shaped material, for instance corrugated tubes, electric cables or lines, there is provided on the surface of the material an armoring comprising a plurality of wires which are applied with a long length of lay and are held by a further armoring layer. The wires are applied to the material with changing direction of lay. The additional armoring layer is at least one wire applied with a short length of lay and which is applied with initial tension onto the first armoring layer.

9 Claims, 4 Drawing Figures

TUBE HAVING AN ARMORING CONSISTING OF A PLURALITY OF WIRES

FIELD AND BACKGROUND OF THE INVENTION

The invention concerns strand-shaped material, for instance a tubular metallic structure with helical or annular corrugations or an electric cable or an electric line having an armoring which consists of a plurality of wires resting on the surface of the material, which are applied with a long length of lay and are held by a further armoring layer.

Corrugated tubes have the advantage of being both flexible and transversely rigid. Their disadvantage is that when subjected to load by internal pressure they, lengthen in longitudinal direction at first elastically and then plastically, even under slight pressures. It is known to eliminate this disadvantage by placing a braiding around the corrugated tube. The braiding restrains the longitudinal lengthening and, as a result, makes the tubes somewhat more resistant to pressure. Braiding machines are, however, very slow and are extremely expensive, particularly for tubes of large diameter.

From British Patent No. 1 336 630 a corrugated tube is known which is reinforced by a plurality of armoring wires applied with a long length of lay. Over the first armoring layer there is a second armoring layer, also applied with a long length of lay and advantageously applied in the direction opposite to the direction of lay of the first armoring layer. The advantage of this known construction is that as a result of the armoring layers the corrugated tube can take up substantially higher pressures than previously without lengthening as a result of the internal pressure. The disadvantage of the known conduit is that the method of applying the armoring wires is very expensive, particularly when tubes of large diameter are to be armored. Upon the manufacture of such tube it is necessary that the reels which hold the individual armoring wires travel around the longitudinal axis of the traveling corrugated tube.

From Federal Republic of Germany OS No. 27 05 743 it is known to apply a layer of wires onto the surface of an electric cable. Such layers of wires serve, in the cable art, as concentric ground or neutral line. Upon the production of such layers, the layer of wire is held, after application onto the surface of the cable, by a strap which may consist, for instance, of plastic or else of metal.

One important advantage of such a cable provided with a ground or neutral line is that upon the production of a junction point merely the conductor and the insulation need be cut while the ground or neutral conductor can be easily removed from the surface of the cable and remains uncut. Such a technique is known, for instance, from Federal Republic of Germany Utility Model GM No. 18 75 570. It is therefore absolutely necessary that the layer of wire be movable in axial direction. To this extent the known layer of wire cannot be considered an armoring layer which is intended to take up tensile forces.

The object of the present invention is to provide a strand-shaped material which can take up high tensile forces and can be manufactured economically, particularly also in large diameters.

SUMMARY OF THE INVENTION

The object of the invention is obtained by applying wires of a first armoring layer with alternating direction of lay onto the material and a further armoring layer comprises at least one holding wire applied with a short length of lay which is laid onto the first armoring layer with initial tension. Due to the fact that wires of the first layer are applied in alternate direction of lay, the armoring wires can be taken from stationary reels. One can therefore operate with a very simple cabling device. As a result of the holding wire which is applied with a short length of lay, the individual wires of the first armoring layer are held firmly tensioned on the material, so that an increased frictional lock is produced which results in the ability to withstand high tensile stress and, in the case of a corrugated tube, avoids elongation of the corrugated tube. The decisive factor for the action of this simple, economical reinforcement is, essentially, the force or initial tension with which the holding wire is applied. The angle of the armoring layer with respect to the longitudinal axis of the corrugated tube is also of importance. An angle of 5° to 45° has been found advantageous in practice. The effect of this reinforcing layer improves as the angle with respect to the longitudinal axis decreases. To be sure, the lower limit of the angle is determined by the required flexibility of the material.

In the case of electric cables, the holding wire produces an intimate bond between the electric cable and the armoring layer. It has suprisingly been found that the flexibility of a cable armored in accordance with the invention is not substantially reduced by the armoring layer.

In accordance with one particularly advantageous embodiment of the invention, the angle of wrap of the first armoring layer is less than 360° and preferably less than 180°. The armoring wires should be present in such number that they cover at least 50% of the surface of the material. This is important, in particular, in the case of tubes if—as is advantageous in accordance with another concept of the invention—the diameter of the wires corresponds approximately to the wall thickness of the tube. As the further armoring layer there is used merely one holding wire which is applied with an initial tension which is just below the yield point of the wire. By this measure the armoring wires are pressed firmly against the surface of the material and thus increase the frictional force between the material and the armoring wires. In the event that the material is a tube and has a helical corrugation it is advisable to apply the holding wire with a length of lay which corresponds approximately to the pitch of the corrugation. This wire should then rest on the armoring layer in the region of the valleys of the corrugations of the tube and press the armoring layer into the valleys of the corrugations. In addition to the force-lock applied by the initial tension there is also produced in this manner a form-lock between the armoring wires and the surface of the corrugated tube. An extruded outer jacket of plastic can also be applied onto the armoring layer.

It is also possible to apply over the first armoring layer a second armoring layer having the opposite direction of lay and to hold the two armoring layers and press them onto the material and against each other by a common holding wire which rests on the second armoring layer.

The invention furthermore concerns a method of manufacturing strand-shaped material which is characterized by the fact that a plurality of wires are applied with long length of lay onto the strand-shaped material, distributed uniformly on the circumference of the tube, that the direction of lay is continuously changed, and that immediately after the placing on of the wires they are fixed by a holding wire which is applied with a relatively short length of lay. It is essential in this connection that the holding wire is wound-on immediately after the applying of the armoring wires onto the material, in order to provide assurance that the armoring wires lie in the desired form on the material.

In accordance with a further development of the method of the invention, over the first layer of wire there is applied a second layer of wire whose direction of lay is opposite to the direction of lay of the first layer of wire and the two layers of wire are jointly fixed by the holding wire. By this measure the tensile strength of the material can be substantially increased. The layer of wire, or both layers of wire, are applied, to particular advantage, with a wrap of less than 360° and preferably less than 180°. It is also essential that the angle at which the armoring layer is applied to the surface of the materal be not greater than 45° to the longitudinal axis of the material at any place. If the angle is selected larger than this, then there is a smaller component of force in the longitudinal axial direction. This would lead to a reduction in the tensile forces which can be transmitted. The holding wire is applied, to particular advantage, with a pitch which is smaller than the diameter, and preferably smaller than half the diameter, of the strand-shaped material. Since the frictional force between the holding wire and the armoring layer and thus between the armoring layer and the surface of the strand-shaped material is applied by the holding wire and acts essentially only in the region of the holding wire, this measure also acts to increase the tensile strength.

The invention also concerns an apparatus for the carrying out of the method for the manufacture of armored corrugated tubes, the apparatus consisting, according to the invention, of a tube manufacturing machine which shapes a longitudinally entering metal strip continuously into a tube and welds its longitudinal seam, a corrugating device arranged behind same which corrugates the welded tube, a cabling device which applies the first armoring layer with alternating direction of lay, a central spinner which applies the holding wire, and an extruder. The cabling device consists of a plurality of reels, mounted fixed in space, for the armoring wires as well as a perforated disk which is driven with alternating direction of rotation.

In order to apply the wire with the necessary initial stress, the storage reel for the wire is driven in the direction opposite to the direction of unwinding. The driving force should be so large that the necessary initial tension can be produced in the wire.

BRIEF DESCRIPTION OF THE DRAWINGS

With the above and other objects and advantages in view, the present invention will become more clearly understood in connection with the detailed description of preferred embodiments, when considered with the accompanying drawings, of which.

DETAILED DESCRIPTION OF THE PREFERRED EMBODIMENTS

In the description of the figures, reference is to corrugated tubes. However, it applies similarly to electric cables and lines.

Figure 1:
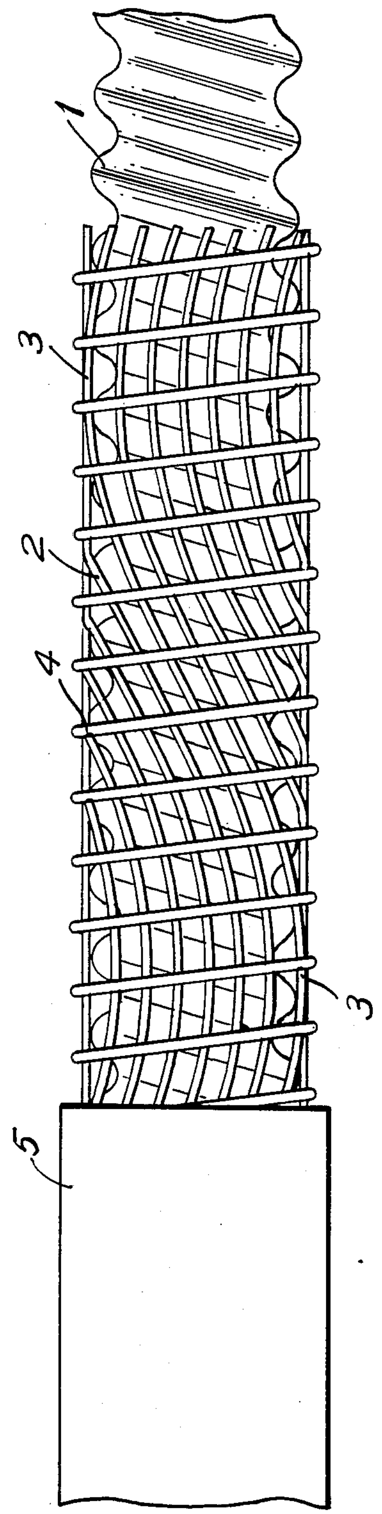
FIG. 1 is a diagramatic side view of a strand-shaped material in practice of the invention.

FIG. 1 shows a helically corrugated metal tube 1 on whose outer periphery of plurality of armoring wires 2 are uniformly distributed. The armoring wires 2 are applied with a relatively long length of lay, i.e. at a small angle to the longitudinal axis of the tube 1. At the points of inflection 3 the direction of lay of the cabling changes. The armoring wires 2 are held in position by a holding wire 4 which is applied helically over the armoring wires 2 with a relatively short length of lay. In order that the armoring wires 2 can prevent lengthening of the corrugated tube 1 when it is acted on by internal pressure, it is necessary that the armoring wires 2 lie firmly against the surface of the tube. For this purpose, the holding wire 4 is applied with a large initial tension which is preferably just below the yield point of the wire. Due to this large pressing force, the friction between the corrugated tube 1 and the armoring wires 2 is increased. A plastic jacket 5, preferably of polyethylene, is extruded to surround the assembly. The diameter of the armoring wires should correspond approximately to the wall thickness of the corrugated tube 1. Depending on the outside diameter of the corrugated tube 1, the wall thickness is between 0.5 and 2 mm. The diameter of the holding wire 4 may be of the same order of magnitude, but should advisably be somewhat larger.

Figure 2:
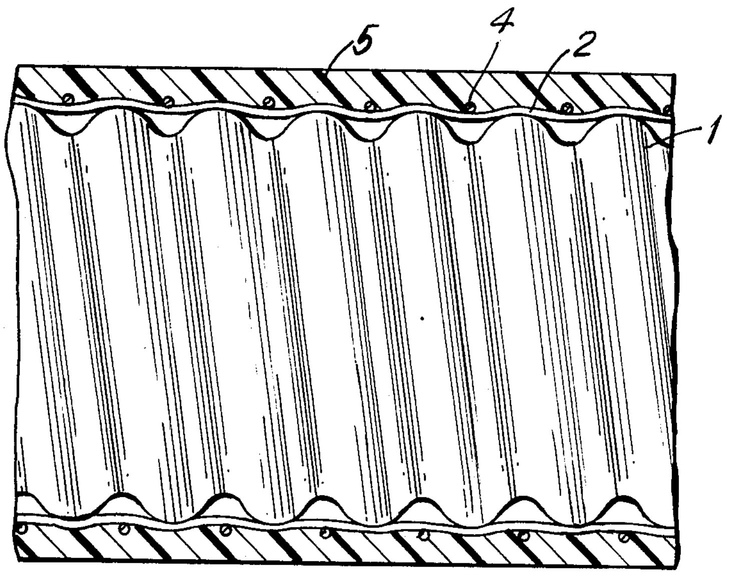
FIG. 2 is a diagramatic partial side view of an alternative embodiment.

FIG. 2 shows a particularly advantageous embodiment of the invention. In this case the corrugated tube is also helically corrugated. The armoring wires 2 are applied in the same manner as in FIG. 1, but the holding wire 4 is applied with a length of lay which corresponds to the pitch of the corrugated tube 1. The holding wire 4 lies in the region of a corrugation valley, so that, due to its initial tension, it reshapes the armoring wires 2 around the corrugation peaks of the corrugated tube 1. In this way, in addition to the friction lock caused by the initial tension, there is also a form-lock which, in the same way as the friction-lock, prevents the corrugated tube 1 from elongating when acted on by internal pressure.

Figure 3:
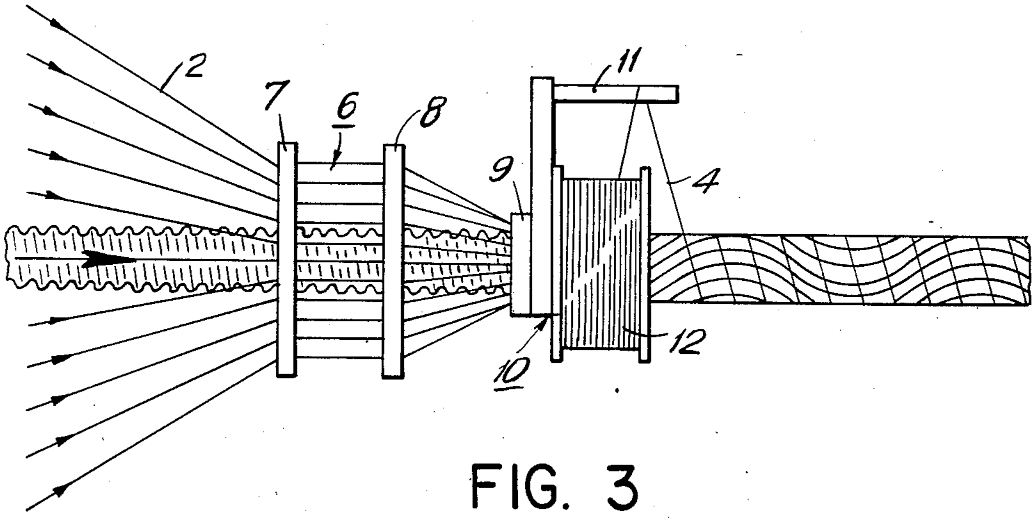
FIG. 3 is a diagramatic side view of an apparatus in practice of the invention.

The manufacture of the tubular structures shown in FIGS. 1 and 2 is effected in the manner that, as shown in FIG. 3, the corrugated tube 1 which emerges from a tube welding and corrugating device (not shown) is wrapped with the armoring wires 2 by means of a cabling device 6. The cabling device 6 consists of a stationary perforated disk 7 and another perforated disk 8 which is driven with alternating direction of rotation. The larger the angle of wrap of the armoring wires 2 with respect to the corrugated tube 1, the greater the distance between the perforated disks 7 and 8 must be. With a large distance between the perforated disks 7 and 8, it is advantageous to provide between the perforated disks a tube having a somewhat smaller diameter than the diameter of the circle of holes and to fasten said tube to the perforated disk 7. The armoring wires coming from the perforated disk 8 are placed by means of a so-called cabling nipple 9 onto the surface of the corrugated tube 1 and are fixed directly behind the cabling nipple 9 by the holding wire 4. For this purpose there is used a so-called central spinner 10 which conprises a rotating laying arm 11 as well as a mount for the supply reel 12. In order to apply the necessary initial tension for the holding wire 4, the supply reel 12 is driven in direction opposite the direction of unwinding, in the manner that even upon a decrease in the diameter of the layers of wire on the supply reel 12 the force of removal and thus the initial tensioning of force for the holding wire 4 is at all times constant. The armored corrugated tube 1 emerging from the winding device 10 is then provided, by means of an extruder with the plastic jacket 5, in a manner not shown in the drawing.

Figure 4:
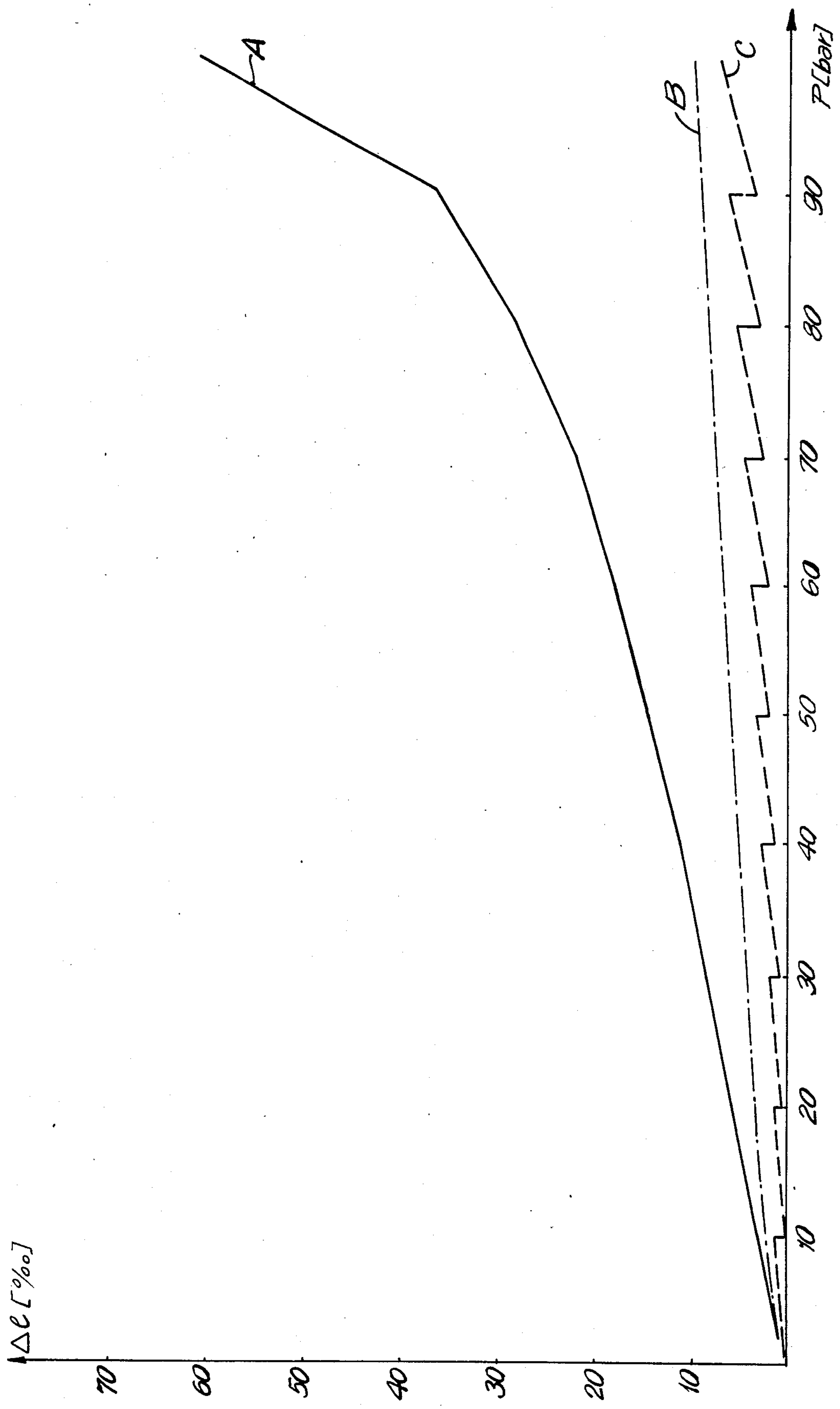
FIG. 4 is a graphical representation of the advantageous effect of the armoring of the invention.
Figure 5:
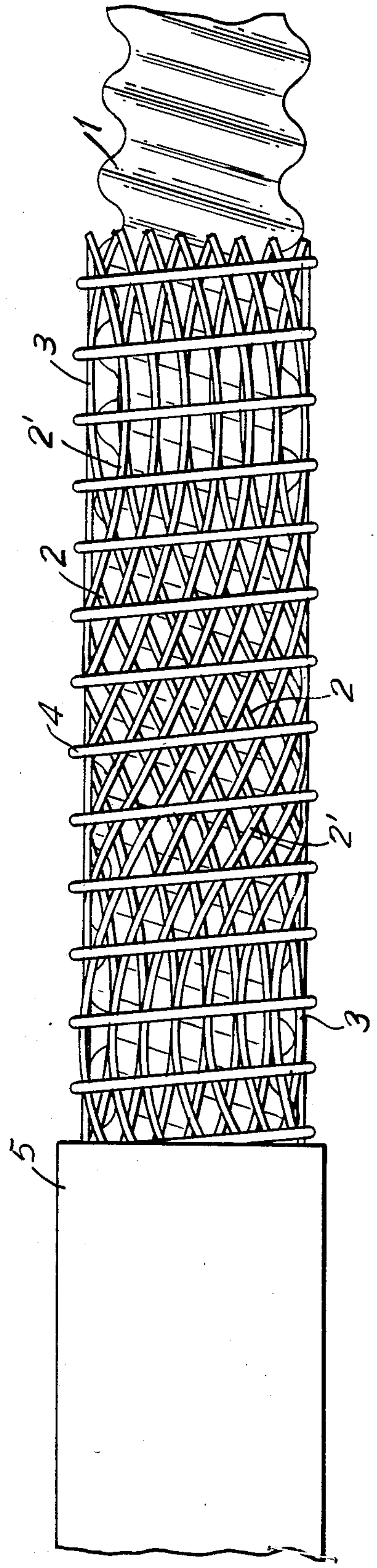

The advantageous effect of the armoring of the invention will be made clear on basis of the graph shown in FIG. 4. The pressure is plotted on the abscissa and the change in length per mil is shown on the ordinate. The curve A shows the elongation of a corrugated tube of alloy steel having an inside diameter of 140 mm, an outside diameter of 180 mm, and a wall thickness of 0.3 mm. The corrugation pitch was 4 mm. It can clearly be seen that this unarmored corrugated tube lengthens even at relatively low pressures. The curve B shows the course for a similar corrugated tube which has been provided with a wire armoring consisting of 40 individual wires of 0.5 mm which lay on the surface of the tube with a length of lay of 200 and an angle of wrap of 210°. The holding wire 4 had a diameter of 0.5 mm and was applied with a pitch of 6 mm. It can clearly be seen that the elongation is substantially less than in the case of the unreinforced corrugated tube. A similarly prepared corrugated tube was loaded step-wise with pressure, pressure relief being effected after each step. The behavior of the tube tested in this manner is shown in Curve C. Here it can clearly be seen how large the elastic portion of the elongation (vertical portion of the curve C) is in each case.

The applied wires 2 can prevent the tube or cable 1 from lengthening in longitudinal direction and thus increase the tensile strength only with the component thereof which acts in the longitudinal direction, i.e. the smaller the angle of the wires to the longitudinal axis of the cable or tube 1, the greater is their effect. However, it must be noted that the wires 2 cannot extend parallel to the longitudinal axis of the cable or tube 1 since in such case they would be stretched or bulged upon bending. The larger the angle between the wires 2 and the longitudinal axis of the cable or tube 1, the smaller is the component of force acting in the longitudinal direction. The optimum with respect to tensile strength and flexural strength of the cable or tube 1 is between 15° and 25°.

Without the holding wire 4, the wires 2 cannot transmit any forces since they are not connected to the surface of cable or tube 1. The connection is produced by the holding wire 4 which is wrapped around the wires 2 with the smallest possible pitch. The force with which the wire 4 is wrapped is of controlling importance. From this force there results, namely, the perpendicular force necessary for the friction between the wires 2 and the cable or tube 1. For the force which can be taken up in longitudinal axial direction there is a dependence on the following factors:

1. number of wires;
2. angle formed by the wires to the axis of the cable or tube;
3. diameter of the wires;

4. coefficient of friction between the wires and the cable or tube;
5. coefficient of friction between the holding wire and the armoring wires; and
6. tensile force of the holding wire.

These factors must be optimized in accordance with the purpose of use.

For many purposes of use it may be advisable to provide between the surface of a cable and the armoring layer of the wires a metal tape, preferably of copper, which contacts the individual wires to each other. In this case, the armoring layer would also produce electric shielding at the same time.

By means of the invention it is possible substantially to improve the mechanical properties of a corrugated tube or a cable without its flexibility being substantially reduced.

We claim:

1. In a tube having an armoring, said armoring comprising a first and a further armoring layer, said first armoring layer having a plurality of armoring wires lying on the surface of said tube, said armoring wires being applied with a long length of lay and being held by said further armoring layer, the improvement wherein the armoring wires of the first armoring layer each have an alternating clockwise and counterclockwise rotational directions of lay on said tube with respect to a longitudinal axis of the tube viewed in transverse cross-section, and the further armoring layer comprises at least one holding wire having a short length of lay which is placed with initial tension over the first armoring layer.

2. The tube having an armoring according to claim 1, wherein the first armoring layer has an angle of wrap less than 360°.

3. The tube having an armoring according to claim 2, wherein the angle of wrap of the first armoring layer is less than 180°.

4. The tube having an armoring according to claim 1, wherein said armoring wires cover at least 50% of the surface of the tube.

5. The tube having an armoring according to claim 1, wherein said further armoring layer comprises a single said holding wire having said initial tension just below the yield point of said holding wire.

6. The tube having an armoring according to claim 1, further comprising an extruded plastic jacket applied over said armoring layers.

7. The tube having an armoring according to claim 1, further comprising a second armoring layer is arranged over and with opposite direction of lay with respect to said first armoring layer, and wherein both said first and second armoring layers are fixed in common by said at least one holding wire.

8. The tube having an armoring according to claim 1, wherein said tube having a wall thickness and the diameter of the armoring wires corresponds approximately to the wall thickness of the tube.

9. The tube having an armoring according to claim 1, wherein said tube having a helical corrugation, and wherein said holding wire has a length of lay which corresponds approximately to the pitch of the corrugation, and the holding wire rests in the region of valleys of the corrugations of the tube on the first armoring layer and presses the first armoring layer into the valleys of the corrugation.

* * * * *